United States Patent Office 3,422,062
Patented Jan. 14, 1969

3,422,062
COPOLYMERS OF ALKENYL PHENOL
Charles L. Segal, Los Angeles, and Philip D. Faurote, Canoga Park, Calif., assignors to North American Rockwell Corporation, a corporation of Delaware
No Drawing. Filed Nov. 29, 1963, Ser. No. 327,048
U.S. Cl. 260—47                                    4 Claims
Int. Cl. C08g 33/10

ABSTRACT OF THE DISCLOSURE

Solid, phenylene oxide copolymers of a phenol of the general formula

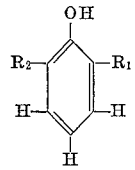

wherein $R_1$ is an alkenyl group and $R_2$ is hydrogen or alkyl and a different phenol of the general formula

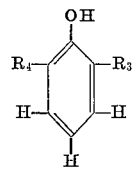

wherein $R_3$ and $R_4$ are hydrogen or alkyl.

These copolymers are useful as electrical insulation, structural laminates, and protective coatings.

---

This invention relates to new polymeric materials. More particularly, the invention relates to novel polymers and copolymers of ortho-alkenyl phenols and novel cross-linked systems of such polymers and copolymers which can serve as thermally stable materials.

To date, a number of new polymeric materials have been described which are more thermally stable than the previously available conventional materials. Examples of the thermally stable polymers so previously described include the unsubstituted poly(phenylene oxides) and halogen-substituted poly(phenylene oxides). Where the linkage between the phenylene groups of such polymers is 1,4, the polymers are generally of low molecular weight, insoluble and infusible. Where the link in the polymers is 1,3, the resulting polymers are low molecular weight fluids or low melting solids. Whether the linkage be 1,3, or 1,4, the polymeric phenylene oxides are not amenable to formation into structural form such as laminates, molding, and the like; this being due to either their insolubility, infusibility, or lack of ability to cross-link. Dialkyl-substituted para oriented poly(phenylene oxides) have been prepared by the oxidative coupling of the corresponding phenol. These polymers, though generally fusible and soluble, have not been reported as amenable to being controllably cross-linked. When the potentially cross-linkable allyl groups have been substituted for the short chain, unbranched alkyl groups in the oxidative coupling reaction, no polymers were previously obtained. Dialkyl and allyl-alkyl containing homopolymers and copolymers have been prepared by an alternate synthetic method; i.e. the coupling of the corresponding 4-halo phenols in an Ullmann type reaction. In this instance, the preparation of the necessary halo-derivative is both expensive and time consuming. In general, the polymers prepared by this method are soluble, fuse with difficulty, and exhibit a moderate thermal stability. Controlled cross-linking of these particular allyl-containing polymers and copolymers prepared from the 4-halo phenols has not been reported.

One aspect of this invention is based upon the formation of a homopolymer or copolymer prepared in the para phenylene oxide structure by the oxidative coupling of the corresponding phenol as will be further explained. Such polymers can be controllably cross-linked into an infusible, insoluble three-dimensional network which will exhibit highly desirable and useful thermal properties. Such thermally stable, infusible, and insoluble polymers as formed by this second aspect of this invention have application as molded products, rocket motor components including nozzles, insulative and ablative liners, and in high temperature gaskets and seals. Additional applications would include those calling for high temperature resistance, such as electrical insulation, structural laminates, and protective coatings.

The novel poly para (alkenyl-phenylene oxides) polymers of this invention, in order to be useful as described, must be cross-linked. This is accomplished by combining the homopolymers or copolymers with a suitable free radical catalyst under heat and pressure. The ability to form long polymeric chains by free radical activation of olefinic double bonds has been well established. For example, mono-vinyl compounds such as styrene vinyl-chloride, vinyl-acetate, and methylmethacrylate can be polymerized by reaction in the presence of an appropriate free radical catalyst. Diolefins, including butadiene and isoprene also polymerize with free radical catalysts. Additionally mono- and multi-allyl compounds can be polymerized. For example, allyl-acetate forms a linear chain while diallyl-phthalate forms a complex linear-cyclic chain at low conversions. Thermally stable compositions have been obtained from the free radical polymerization and controlled cross-linking of various diallyl-phthalate isomers and tri-allyl-cyanurate.

Thermally stable polymers based on the p-phenylene oxide structure have been previously described. The unsubstituted poly(p-phenylene oxides) are generally infusible and insoluble and thus cannot be readily fabricated into a useful form. Alkyl-substituted poly(p-phenylene oxides), although generally soluble and somewhat fusible, are not readily amenable to controlled cross-linking; the cross-linking being a desirable characteristic for retention of a fabricated form. Noticeable loss of solubility due to cross-linking can be obtained when such polymers are heated for extended periods at temperatures in excess of 400° F. Although alkenyl-containing polymers may also be thermally cross-linked, and at temperatures lower than the alkyl-substituted analogs, the control of the process is difficult and the product is partially degraded in the process. Prior to this invention only one known approach has been attempted for the controlled cross-linking of alkenyl-containing phenylene oxide polymers. In this method the allyl-containing polymers, which were derived from the corresponding p-bromo phenols, were converted into the corresponding epoxy derivatives. The resulting epoxy resins were then cross-linked with conventional epoxy curing agents. It is part of this invention to prepare a superior cross-linked network through an easier and more successful approach than that previously attempted. In the herein invention, the novel alkenyl-containing poly (p-phenylene oxides) are controllably cross-linked at moderate temperatures by the use of free radical catalysts with the resulting infusible, insoluble, three-dimensional network exhibiting desirable and useful thermal properties.

An object of this invention relates to new alkenyl-containing p-phenylene oxide polymers and copolymers.

An additional object of this invention relates to new cross-linked networks of the novel alkenyl-containing p-phenylene oxide polymers and copolymers.

A still further object of the invention relates to the formation of new thermally stable polymeric compositions useful as thermal insulators, ablators, dielectrics, and the like.

These and other objects of the invention will become more apparent from the following detailed description.

The alkenyl-substituted phenols utilized to form the p-phenylene oxide polymers of the invention have the following general formula:

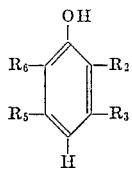

wherein $R_2$ is an alkenyl radical having from 2 to 4 carbon atoms, $R_3$, $R_5$ and $R_6$ are selected from the class consisting of hydrogen, aliphatic hydrocarbon groups having from 1 to 4 carbon atoms, halogen radicals, fluoroaliphatic groups having from 1 to 4 C atoms, ethers of the formula OR wherein R is selected from the class consisting of hydrocarbon chains having from 1 to 4 C atoms, and fluoroaliphatic groups having from 1 to 4 C atoms, aliphatic acids and acid esters having from 1 to 4 C atoms, olefins having from 2 to 4 C atoms, and hydrocarbon substituted and unsubstituted amines having up to 3 C atoms in a substituted chain, and wherein not more than three R's are substituted such that when $R_5$ is substituted the total C atoms in $R_2$ and $R_5$ is not more than 8, when $R_3$ and $R_6$ are substituted, the total C atoms in $R_2$, $R_3$ and $R_6$ do not exceed 9, when $R_3$ is substituted the total C atoms in $R_2$ and $R_3$ is not more than 4.

Though the preceding description recites limits upon the number of carbon atoms in side chains attached to the phenol, slightly longer groups could be used. However, it is preferred to so limit the length of the chains so as to prevent steric hindrance and not interfere with the desired oxidative coupling at the 1,4 positions. Thus, phenols having 5 or 6 C atoms, for example, in the attached groups could be used, though are not preferred.

Many phenols of this type are well-known compounds and are commercially available, others are available by the standard methods of organic chemistry. Particularly preferred are the phenols of the above formula wherein $R_2$ is allyl. Phenols found to produce outstanding properties when polymerized and further cross-linked include 2-allyl-6-methyl phenol, 2,6-diallyl phenol. Preferred phenols, for copolymerization include 2,6-dimethyl phenol, 2-methyl phenol and 2,5-dimethyl phenol.

In accordance with this invention solid phenylene oxide polymers, resulting from the homopolymerization of the above described alkenyl phenols, can be made. In addition, also contemplated are copolymers of the alkenyl-substituted phenols above described with phenols wherein $R_2$ is selected from the same class of radicals as are $R_3$, $R_5$ and $R_6$, as above described. For example, the polymers of this invention comprise those resulting from homopolymerization of 2-allyl-6-methyl phenol. Under conditions for copolymerization, a copolymer would result from the polymerization of, for example, 2-allyl-6-methyl phenol and 2,6-dimethyl phenol. Thus, the invention broadly embraces the formation of p-phenylene oxide polymers wherein at least one of the phenols is 2-alkenyl-substituted.

The polymers of the invention are made by passing oxygen through a solution of the phenol or phenols in organic solvent and amine, with a copper salt as a catalyst. The stoichiometry of the reaction to form the homopolymers is as follows:

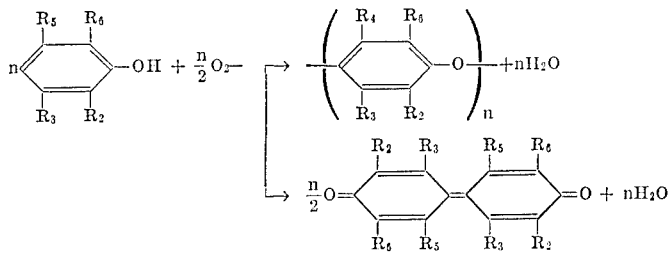

for copolymers the reaction is as follows:

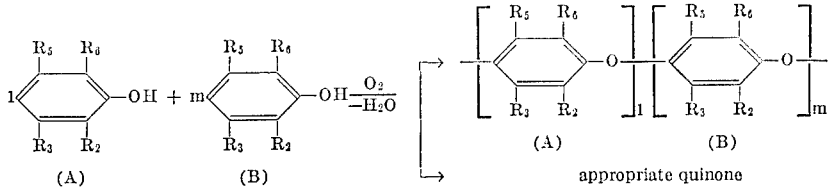

wherein $n$ is a whole number at least equal to 10, and $1+m$ should at least equal 10. The above procedure is referred to as an oxidative coupling technique. Within the range of the R substituents above stated, most of the reaction proceeds to the phenylene oxide polymer with relatively little carbon-carbon coupling occurring to give the diphenoquinone. The smaller the R groups the more linear polymer will be obtained in the above reaction.

The reactions used to form the novel polymers of this invention have been reported by Hay and are described in great detail in his French Patent No. 1,234,336. Hay describes the above mechanism for forming certain polymers, and additionally sets forth in detail the process by which such polymers are made. However, Hay does not obtain and did not report obtaining the polymeric products of this invention. When Hay utilizes alkenyl-substituted phenols to form polymers he reports the formation of oils indicating a low molecular weight material. The particular phenylene oxide polymers of this invention are solids having an intrinsic viscosity in solution of at least .05 deciliter per gram. The intrinsic solution viscosity will often range above 2.0 deciliters per gram. However, it is generally preferred that the particular polymers have intrinsic solution viscosities of .30 to 1.5 deciliters per gram. As a result the solid long chain polymers of alkenyl-substituted p-phenylene oxides, which can be cross-linked as will be further explained in detail, had not existed.

As previously stated, in the formation of the polymers of this invention one of the starting phenols must have an alkenyl group in the 2-position. Examples of the phenols that are contemplated within the generic formula previously given include 2-allyl-6-methyl phenol, 2,6-dimethyl phenol, 2,6-diallyl phenol, 2-methyl phenol, 2,5-dimethyl phenol, 2-allyl-5-chloro phenol, 2-allyl-3-methoxy phenol, 2-ethyl-6-vinyl phenol, 2-allyl-3-isobutyl-6-methyl phenol, 2-allyl-6-carboxy phenol, 2-ethoxy-5-methyl-6-ethyl phenol, 2-butyl phenol, 2-allyl-6-chlorethoxy phenol, 2,5-dibutyl phenol, 2,3,5-trimethyl phenol, 2-butenyl-6-methyl phenol, 2-allyl-6-ethyl phenol, 2-allyl-6-(2,2,2-trifluoroethyl) phenyl, 2,5-diethyl-6-(2,2,2-trifluoroethoxy) phenol, 2-allyl-3-hydroxy-trifluoromethyl benzoate, 2-hydroxy-3-allyl-methyl benzoate.

The basic polymers of the invention are prepared as previously indicated by reacting the phenol with oxygen in the presence of an amine and cuprous salt catalyst. The procedure is well described by Hay. Generally the phenol can be dissolved in a tertiary amine utilizing the cuprous salt catalyst. However, other solvents can be present which will not enter into the reaction such as ketones, ethers, esters, alcohols, and the like. Oxygen gas is then bubbled through the mixture. An exothermic reaction transpires and, as indicated in the general stoichiometric formula for the reaction, water becomes a by-product. The reactions are normally carried out at atmospheric pressure and at room temperature. Generally, it is desired that the maximum temperature achieved by the exothermic reaction does not exceed 100° C. so that cooling may be necessary. Oxygen is passed through the reaction mixture until it is no longer absorbed. Proper stirring is maintained throughout the reaction. The product is then poured into an appropriate nonsolvent (methanol, ethanol, acetone, water, etc.) containing hydrochloric acid which serves to neutralize the amine and is precipitated therefrom. The preparation of the polymers of this invention will be better understood from the following examples.

EXAMPLE 1

The starting phenol was prepared from a corresponding ether as follows:

Anhydrous potassium carbonate, 395 g. (2.6 moles), was added to a stirred solution of 270 g. (2.5 moles) o-cresol and 314 g. (2.6 moles) allyl bromide in 800 ml. acetone. The mixture was slowly heated to reflux, and stirring under reflux continued for 23 hours. After stripping off about half of the solvent, 1500 ml. water was added, the product layer separated, and the aqueous layer was extracted several times with petroleum ether. These extracts were combined with the crude product and the solution washed with 10 percent sodium hydroxide, followed by water, and then dried over anhydrous potassium carbonate. Distillation gave 318 g. (86%) product, $b_1$ (boiling point at 1 mm.) 45–50° C., $N^{25}$ D (index of refraction at 25° referred to Na D-line) 1.5135–1.5165. Allyl o-tolyl ether (318 g., 2.15 moles) was stirred and heated slowly (about one hour) to reflux (~180° C.) under a nitrogen atmosphere. When, after three hours at reflux, the temperature leveled off at 230° C., the rearrangement was considered complete. The cooled pot contents were taken up in twice their volume of 20% sodium hydroxide, extracted several times with petroleum ether, neutralized with hydrochloric acid, and the product layer separated. The aqueous phase was extracted several times with petroleum ether, and these extracts combined with the product dried over anhydrous potassium carbonate and distilled to give 205 g. (64% conversion) crude phenol, $b_1$ 59–66. A second wash and distillation gave a product, $b_1$ 58–61, $N_D^{23.5}$ 1.5365.

EXAMPLE 2

A poly(2-allyl-6-methyl phenylene oxide) was prepared by the oxidative coupling of the corresponding phenol. A mixture of 0.4 g. cuprous chloride and 90 ml. pyridine in 300 ml. nitrobenzene was stirred rapidly while a slow stream of oxygen was bubbled through the solution. After about 60 minutes, the solution had taken on a deep green color, and 11.8 g. (0.08 mole) of 2-allyl-6-methyl phenol was added producing a color change to clear amber. Rapid stirring in the oxygen atmosphere was continued for five hours by which time the solution had again become green, and oxygen was no longer absorbed. The crude polymer was precipitated by dropwise addition of the reaction solution to methanol containing one percent hydrochloric acid. After washing and slurrying with methanol, the polymer was filtered and redissolved in chloroform; the polymer was then reprecipitated from the chloroform solution by dropwise addition to methanol. The polymer thus obtained was a light brown powder; the yield was 8.6 g. (73%); limiting viscosity (benzene at 25° C.) was 0.11; this polymer softened and fused over the temperature range 150–175° C. This polymer could be converted into an insoluble infusible mass when heated for a short time with 5% by weight of benzoyl peroxide.

EXAMPLE 3

A copolymer of 2-allyl-6-methyl phenol and 2,6-dimethyl phenol was prepared by the oxidative coupling technique. Following the procedure given in Example 2, 0.04 mole of each of the two monomers was reacted. The resulting copolymer (structure verified by infrared and NMR spectra) was a light brown powder; limiting viscosity, 0.17 deciliters/g.; softening range of this polymer was 175–200° C. Glass fabric laminates and asbestos-filled molding compositions were prepared from this resinous polymer using an appropriate free radical catalyst as a cross-linking agent. Other copolymer compositions and properties are given in Table I.

TABLE I

| Phenol, moles | | Limiting viscosity, deciliters/g. | Molecular weight [1] | Softening Point range, ° C. |
|---|---|---|---|---|
| 2,6-dimethyl | 2-allyl-6-methyl | | | |
| 0.76 | 0.04 | 0.50 | 18,750 | 250–275 |
| 0.06 | 0.02 | 0.30 | 9,700 | 200–225 |
| 0.04 | 0.04 | 0.17 | 4,300 | 175–200 |
| | 0.08 | 0.11 | 2,350 | 150–175 |

[1] $M^{0.73} = [\eta]/3.8 \times 10^{-4}$

To make the above described poly (p-phenylene oxides) particularly useful, controlled cross-linking thereof has been accomplished. As previously indicated, the polymers are controllably cross-linked at moderate temperatures with a free radical catalyst. This three-dimensional network resulting from such cross-linking produces a heretofore unknown polymeric structure having high thermal stability. This product forms a part of the invention. Understandably, the structure of the cross-linked network is complicated. The cross-links are probably methylene groups of varying length of from one to six carbon atoms.

The cross-linked polymers of the invention are prepared by combining the alkenyl-containing p-phenylene oxide homopolymers, or copolymers with a suitable free radical catalyst under heat and pressure. Any of the previously described alkenyl containing polymers are suitable for the cross-linking steps. It has been found that the cross-linking best occurs at temperatures from 200° F. to 400° F. at pressures from 0 to 500 p.s.i. and at reaction times ranging from 5 to 20 minutes. The free radical catalysts suitable for the cross-linking include but are not limited to t-butyl perbenzoate, di-t-butyl peroxide, cumene hydroperoxide and dicumyl peroxide.

Where better flow and wetting are desirable, a nonreactive plasticizing agent such as poly(m-phenylene oxide) or dioctyl phthalate may be incorporated. Additionally, reactive plasticizers such as diallyl phthalate and styrene are contemplated. The amount of plasticizer that can be added is that required for good processability of the polymers. Thus, the plasticizer can vary from 0 to 15 percent by weight of the polymers. It is preferred that the plasticizer will be one that will enter into the cross-linking so as not to deleteriously affect the properties of the cross-linked polymer. Reinforcing agents such as glass fibers, asbestos, silica, metallic or ceramic whiskers, metal powders, and the like, have also been incorporated in the final cross-linked structure. The fillers can be present in the ratio of up to 2.5 parts of filler to 1 part of polymer. Preferably, the ratio varies from .8 to 1.2 parts of filler to 1 part of polymer. Following are a series of examples indicating the preparation of the cross-linked polymers of this invention.

EXAMPLE 4

Phenylene oxide type polymers of 2-allyl-6-methyl phenol and 2,6-dimethyl phenol were combined with varying amounts of a catalyst, benzoyl peroxide. For example, the cure time of a 50/50 copolymer of the above monomers is compared with the cure time of the allyl-containing homopolymer in Table II.

TABLE II

| Temperature, °F | Cure time, seconds | | | | | | | |
|---|---|---|---|---|---|---|---|---|
| | 50/50 copolymer | | | | Allyl homopolymer | | | |
| | No catalyst | 2% | 5% | 10% | No catalyst | 2% | 5% | 10% |
| 350 | 90.5 | 38.5 | 31.5 | 14 | 53.5 | 13.5 | 10 | 8.5 |
| 400 | 53.5 | 33.0 | 25.5 | 9 | 37.5 | 9.5 | 10 | 5 |
| 450 | 27.5 | 25.5 | 19 | 8 | 20.5 | 7.5 | 5 | 5 |
| 500 | 21.5 | 17.5 | 15 | 4 | 17 | 6 | 5 | 3 |

It should be pointed out that though a catalyst is not mandatory in cross-linking the polymers of this invention, such use provides highly desirable results. When no catalyst is used, a complete cure is not effected at temperatures below 400° F. It is desirable to cure at lower temperatures so as to prevent thermal decomposition of the resultant polymers. Since complete curing can occur at 350° F. and in a relatively short period of time using a catalyst, such a procedure is highly desirable.

EXAMPLE 5

The 50/50 copolymer of Example 3, 100 parts when combined with 2% of cumene hydroperoxide and 200 parts of a low viscosity poly(m-phenylene oxide) fluid, OS–124 manufactured by Monsanto Chemical Co. cured in 18 seconds at 450° F. and 39 seconds at 400° F. A copolymer containing 5 mole percent 2-allyl-6-methyl phenol cured in 20 seconds with 2% cumene at 450° F., showed no change within 5 minutes at 400 or 350° F.

EXAMPLE 6

A low viscosity poly(m-phenylene oxide) fluid, OS–124, 200 parts, when combined with 100 parts of the copolymers of Example 3, Table I, plus 2 parts of benzoyl peroxide, resulted in viscous fluids upon heating. These fluids thickened and gelled within 5 minutes at temperatures above 400° F. in the presence of catalyst. For example, while the uncatalyzed 50/50 and 95/5 copolymers required 4 minutes to gel at 450° F., the catalyzed resins required 1 and 3 minutes, respectively.

To indicate the physical properties at elevated temperatures of the cross-linked polymers of this invention, the following Examples 7 and 8 disclose successful test results.

EXAMPLE 7

A formulation containing 100 parts of a 95/5 copolymer, 5 parts of a 50/50 copolymer, the copolymers being 2-allyl-6-methyl phenol and 2,6-dimethyl phenol, 125 parts OS-124, 50 parts carbon black, and 5 parts cumene hydroperoxide was cured for 30 minutes at 350° F. and tested at several elevated temperatures, see Table III.

TABLE III

| Property | Temperature °F. | | |
|---|---|---|---|
| | 75 | 200 | 300 |
| Tensile strength at break p.s.i | 395 | 153 | 49 |
| Elongation at break percent | 108 | 123 | 90 |

EXAMPLE 8

An asbestos-filled molding compound based on a 50/50 copolymer had a room temperature flexural strength of 9350 p.s.i.; after 2½ hours at 500° F., the flexural strength was 8100 p.s.i.

Due to the orientation of the phenol groups in the polymeric material, the above cross-linked structure is infusible providing excellent heat resistance. The results above Example 8 indicate that the filled polymer retained its high strength properties at elevated temperatures. The results of Table III indicate that the unfilled polymers have good potential for maintaining reasonable properties at elevated temperatures. The increase in such retention of properties through addition of filling substances is demonstrated by Example 8.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Fusible solid phenylene oxide copolymers of (1) an alkenyl phenol of the general formula:

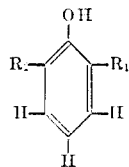

wherein $R_1$ is an alkenyl group containing from 2 to 4 carbon atoms inclusive and $R_2$ is a radical selected from the group consisting of hydrogen and alkyls containing from 1 to 4 carbon atoms inclusive, and (2) a different phenol of the general formula:

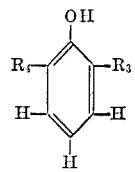

wherein $R_3$ and $R_4$ are radicals individually selected from the group consisting of hydrogen and alkyls containing from 1 to 4 carbon atoms inclusive; which copolymers result from the oxidative coupling of the corresponding phenols, said copolymers possessing indefinite stability at ambient conditions and being capable of curing at elevated temperature by cross-linking through the ortho-alkenyl positions.

2. A cured polymer produced by the cross-linking of the copolymers of claim 1 through the ortho-alkenyl positions, said curing of the copolymers occurring at from 200° F. to 400° F. and a pressure of from 0 to 500 p.s.i.

3. A fusible solid phenylene oxide copolymer of 2-allyl-6-methyl phenol and 2,6-dimethyl phenol which results from the oxidative coupling of the corresponding phenol, said copolymer possessing indefinite stability at ambient conditions and wherein said copolymer cures at elevated temperatures by cross-linking through the 2-allyl position.

4. The cross-linked thermally stable copolymers resulting from the curing of the copolymers of claim 3 at from 200° to 400° F. and pressures from 0 to 500 p.s.i.

References Cited

UNITED STATES PATENTS 3,134,753 5/1964 Kwiatek _____ 260—47
3,281,393 10/1966 Tsou et al. _____ 260—47

FOREIGN PATENTS 1,234,336 5/1960 France.

OTHER REFERENCES

Kurian: J. Polymer Science, vol. 49, pages 267–275 (February 1961).

WILLIAM H. SHORT, *Primary Examiner.*

F. D. ANDERSON, *Assistant Examiner.*

U.S. Cl. X.R.

117—161; 161—192; 260—31.8, 32.4, 33.8, 33.6, 41